(12) United States Patent
West et al.

(10) Patent No.: US 8,189,426 B2
(45) Date of Patent: May 29, 2012

(54) EARTH ANALYSIS METHODS, SUBSURFACE FEATURE DETECTION METHODS, EARTH ANALYSIS DEVICES, AND ARTICLES OF MANUFACTURE

(75) Inventors: Phillip B. West, Idaho Falls, ID (US); Stephen R. Novascone, Idaho Falls, ID (US); Jerry P. Wright, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 13/215,474

(22) Filed: Aug. 23, 2011

(65) Prior Publication Data

US 2011/0305111 A1 Dec. 15, 2011

Related U.S. Application Data

(63) Continuation of application No. 11/778,300, filed on Jul. 16, 2007, now Pat. No. 8,027,223.

(51) Int. Cl.
*G01V 1/00* (2006.01)
(52) U.S. Cl. ............................... 367/41; 367/38
(58) Field of Classification Search .................. None
See application file for complete search history.

(56) References Cited

U.S. PATENT DOCUMENTS

| | | | |
|---|---|---|---|
| 3,859,847 A | 1/1975 | Ronemus | |
| 4,064,481 A | 12/1977 | Silverman | |
| 4,519,053 A | 5/1985 | Bedenbender | |
| 4,749,057 A | 6/1988 | Anstey | |
| 5,780,742 A | 7/1998 | Burns et al. | |
| 6,272,434 B1 | 8/2001 | Wisler et al. | |
| 7,035,165 B2 | 4/2006 | Tang | |
| 7,046,165 B2 | 5/2006 | Beique et al. | |
| 7,357,030 B2 | 4/2008 | Novascone et al. | |
| 7,398,837 B2 * | 7/2008 | Hall et al. | 175/50 |
| 2005/0034917 A1 | 2/2005 | Mathiszik et al. | |
| 2005/0194130 A1 | 9/2005 | Best et al. | |

OTHER PUBLICATIONS

Differential Impendance Obstacle Detection Sensor for Horizontal Directional Drilling, Distribution & Pipeline Technology, Jul. 2005.

* cited by examiner

*Primary Examiner* — Jack W Keith
*Assistant Examiner* — Krystine Breier
(74) *Attorney, Agent, or Firm* — TraskBritt

(57) ABSTRACT

Earth analysis methods, subsurface feature detection methods, earth analysis devices, and articles of manufacture are described. According to one embodiment, an earth analysis method includes engaging a device with the earth, analyzing the earth in a single substantially lineal direction using the device during the engaging, and providing information regarding a subsurface feature of the earth using the analysis.

20 Claims, 8 Drawing Sheets

US 8,189,426 B2

EARTH ANALYSIS METHODS, SUBSURFACE FEATURE DETECTION METHODS, EARTH ANALYSIS DEVICES, AND ARTICLES OF MANUFACTURE

CROSS-REFERENCE TO RELATED APPLICATION

This application is a continuation of U.S. patent application Ser. No. 11/778,300, filed Jul. 16, 2007, now U.S. Pat. No. 8,027,223, issued Sep. 27, 2011, the disclosure of which is hereby incorporated herein by this reference in its entirety.

CONTRACTUAL ORIGIN OF THE INVENTION

This invention was made with government support under Contract No. DE-AC07-05ID14517 awarded by the United States Department of Energy. The government has certain rights in the invention.

TECHNICAL FIELD

The present disclosure relates to earth analysis methods, subsurface feature detection methods, earth analysis devices, and articles of manufacture.

BACKGROUND OF THE DISCLOSURE

Methods exist for gross characterization of subsurface features of the earth. For example, seismic imaging may be used to map underground features. Seismic imaging systems typically include a transmitter and a plurality of receivers each placed at a different location wherein the receivers are separated in distance from the transmitter. Seismic imaging provides gross characterization that may be unsuitable for applications wherein information regarding features of increased specificity is desired.

RADAR systems are sometimes used for gross characterization of subsurface features of the earth. However, these systems tend to perform poorly in moist conditions and generally provide only gross characterization of subsurface features.

Orbital vibrators are also used for subsurface characterization. These systems may be effective at identifying the compositions of portions of the earth, but are generally not designed to identify anomalous subsurface features of the earth.

BRIEF DESCRIPTION OF THE DRAWINGS

Preferred embodiments of the disclosure are described below with reference to the following accompanying drawings.

DETAILED DESCRIPTION

Figure 1:
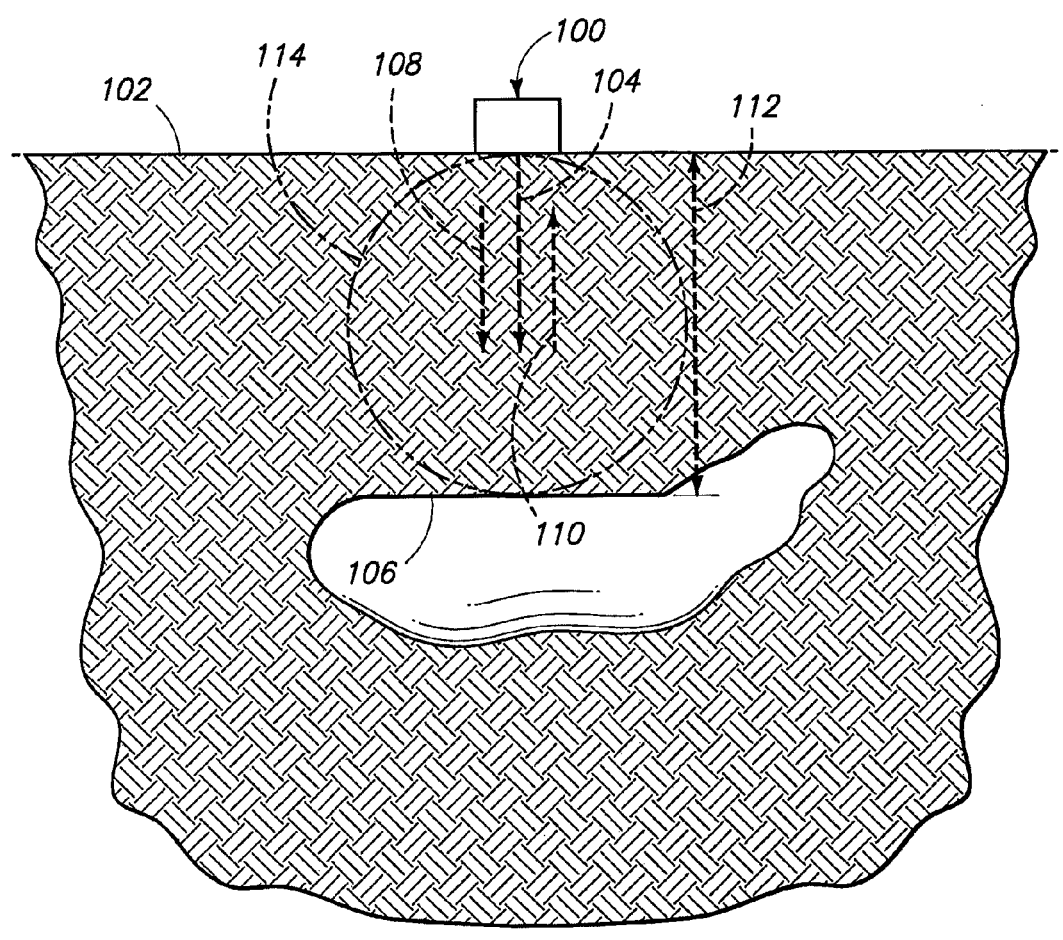
FIG. 1 is an illustrative representation of an embodiment of an earth analysis device engaged with the earth.

This disclosure of the invention is submitted in furtherance of the constitutional purposes of the U.S. Patent Laws "to promote the progress of science and useful arts." (Article 1, Section 8.)

According to some embodiments of the disclosure, apparatus and methods for analyzing the earth to provide information regarding a subsurface feature of the earth are described. In one embodiment, an earth analysis device engaged with the earth vibrates the earth at a plurality of different frequencies in a direction perpendicular to the surface of the earth. A sensor provides data representing motion of the sensor due to vibrations caused by the earth analysis device and due to vibrations reflected by a subsurface feature. A processing module uses the data to determine a location of the subsurface feature. Additional aspects of the disclosure are described in the illustrative embodiments below.

According to one embodiment, an earth analysis method comprises engaging a device with the earth, during the engaging, analyzing the earth in a single substantially lineal direction using the device, and providing information regarding a subsurface feature of the earth in the single substantially lineal direction using the analysis.

According to an another embodiment, a subsurface feature detection method comprises receiving a signal comprising data representing motion of a sensor due to vibrations having a plurality of frequencies at different moments in time transmitted into a location of the earth and due to reflected vibrations received from the location of the earth, for individual ones of the frequencies, determining a magnitude of the signal, identifying at least one point of zero slope using the magnitudes, and determining whether a feature is present in the earth using the at least one point of zero slope.

According to yet another embodiment, an article of manufacture comprises, media comprising programming configured to cause processing circuitry to perform processing comprising accessing data representing motion of a sensor due to vibrations transmitted into the earth at a location by a vibratory source and due to vibrations received from the earth at the location, the vibratory source operating sequentially at a plurality of frequencies, for individual ones of the frequencies, determining a magnitude of the signal during a time period in which the vibratory source operates at the individual frequency, identifying one or more points of zero slope using the magnitudes, and identifying a feature in the earth based on the one or more points of zero slope.

According to another additional embodiment, an earth analysis device comprises a movable member configured to engage the earth, a sensor coupled to the movable member and configured to provide a signal indicative of movement of the movable member against the earth in a single substantially lineal direction, processing circuitry coupled with the sensor and configured to process the signal provided by the sensor and to provide information regarding a subsurface feature located in the single substantially lineal direction away from the movable member.

According to still another embodiment, an earth analysis device comprises a device body, a movable member configured to engage the earth and move relative to the device body along a single axis in response to vibrational energy imparted to the movable member by the earth, a vibratory source configured to vibrate the movable member along the single axis while the movable member is engaged with the earth, and a sensor coupled to the movable member and configured to provide information regarding motion of the movable member resulting from both the vibrations imparted to the movable member by the vibratory source and the vibrations imparted to the movable member by the earth.

Referring to FIG. 1, an earth analysis device 100 according to one embodiment is illustrated. Earth analysis device 100 is engaged with a surface 102 of the earth. Earth analysis device 100 is configured to analyze the earth in a single substantially lineal direction as indicated by dashed line 104 according to one embodiment. As shown by dashed line 104, FIG. 1, the lineal direction may be substantially perpendicular to the surface of the earth.

Earth analysis device 100 may transmit an acoustic wave 108 into the earth. Acoustic wave 108 may encounter a subsurface feature 106. Consequently, a portion of acoustic wave 108 may be reflected by subsurface feature 106. The reflected portion 110 may travel back toward earth surface 102 where it may be detected and measured by earth analysis device 100.

Using measurements of the combination of transmitted acoustic wave 108 and reflected acoustic wave 110, earth analysis device 100 provides information regarding a location of subsurface feature 106. For example, earth analysis device 100 may provide a user with a distance 112 between earth analysis device 100 and subsurface feature 106. Some embodiments of earth analysis device 100 may detect subsurface features located between 20 feet and 75 feet from earth analysis device 100.

Subsurface feature 106 may represent a change in acoustic impedance with respect to a portion of adjacent earth 114 above subsurface feature 106. For example, in FIG. 1, subsurface feature 106 is depicted as an underground void or cave. In this case, the impedance of subsurface feature 106 is substantially lower than the acoustic impedance of adjacent earth 114 since the impedance of air within subsurface feature 106 is less than the impedance of adjacent earth 114. Consequently, a portion of acoustic wave 108 encountering subsurface feature 106 is reflected due to the mismatch in impedance between subsurface feature 106 and adjacent earth 114.

In addition to voids, earth analysis device 100 may detect other subsurface features having a different impedance than earth above the subsurface features. For example, earth analysis device 100 may detect rock type changes, anthropogenic artifacts, faults, underground pools, anomalies, and other features that represent either an increase or decrease in impedance with respect to earth above the subsurface feature 106 or otherwise between earth analysis device 100 and subsurface feature 106.

In one embodiment, earth analysis device 100 analyzes the earth in only a single substantially lineal direction, such as in the direction indicated by dashed line 104. Consequently, earth analysis device 100 may detect subsurface features in the single substantially lineal direction (e.g., located directly below earth analysis device 100).

In this embodiment, earth analysis device 100 may be configured to vibrate a movable member along a single axis aligned with the single substantially lineal direction of analysis in one embodiment. In some cases, the movable member is engaged with earth surface 102 by placing the movable member in direct contact with earth surface 102. Alternatively, the movable member may be coupled to earth surface 102 through an acoustic medium such as an acoustic fluid. This single axis may be substantially perpendicular to the surface of the earth when the earth analysis device 100 is engaged with the earth. By vibrating the movable member along the single axis, earth analysis device 100 transmits acoustic wave 108 into earth surface 102.

Earth analysis device 100 may be a handheld device held in place during operation by an operator. Alternatively, earth analysis device 100 may be a stationary device placed on earth surface 102 by an operator wherein earth analysis device 100 is capable of operating in place without further intervention or stabilization by the operator.

Figure 2:
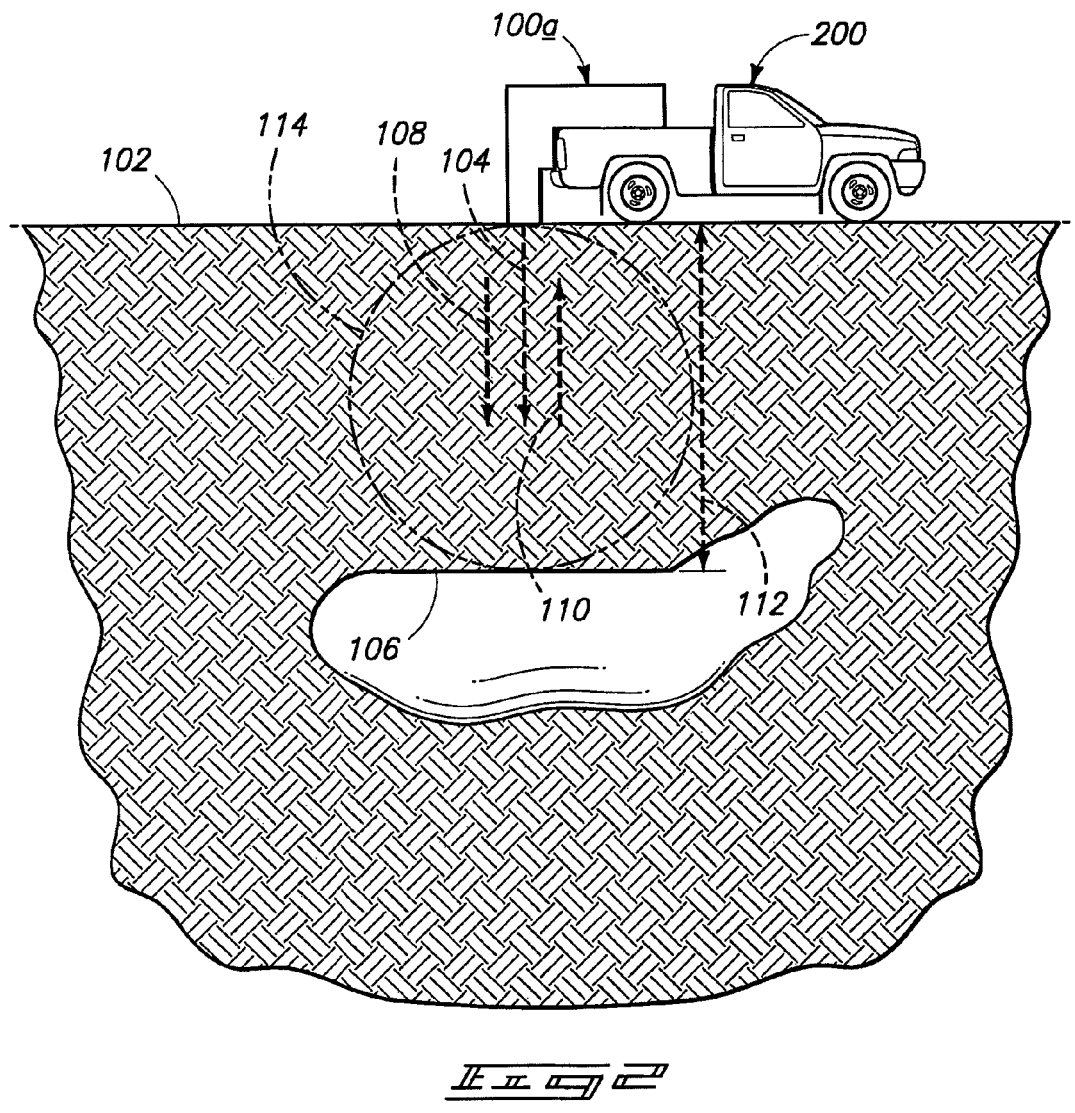
FIG. 2 is an illustrative representation of an embodiment of a vehicle-mounted earth analysis device engaged with the earth.

Referring to FIG. 2, a truck-mounted version of earth analysis device 100 (FIG. 1) is illustrated. The truck-mounted earth analysis device 100a may perform substantially the same functions as earth analysis device 100. However, truck-mounted earth analysis device 100a may have a greater detection range than earth analysis device 100. In other words, truck-mounted earth analysis device 100a may be capable of detecting subsurface features located further away from earth surface 102 than earth analysis device 100, by transmitting a more powerful acoustic wave 108 into the earth.

To achieve increased detection range, truck-mounted earth analysis device 100a may include a linear vibrator having motors and eccentric masses larger than the motors and eccentric masses of a handheld version of earth analysis device 100. Consequently, a truck 200 or other vehicle may be used to transport truck-mounted earth analysis device 100a due to the size and weight of truck-mounted earth analysis device 100a.

Figure 3:
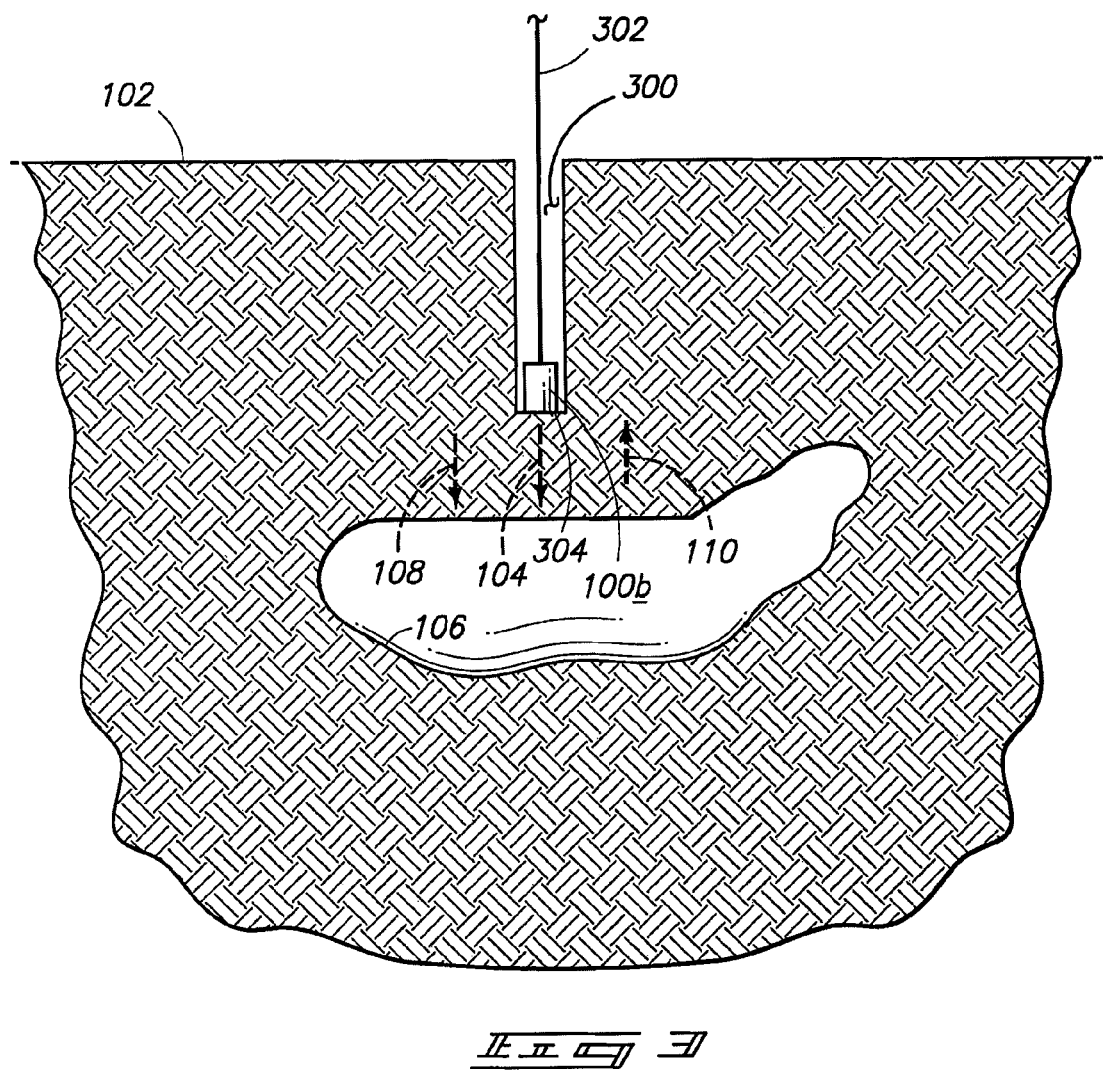
FIG. 3 is an illustrative representation of an embodiment of an earth analysis device engaged with the earth in a borehole.

Referring to FIG. 3, a borehole 300 penetrating earth surface 102 is illustrated. Another version of earth analysis device 100b is lowered within borehole 300 to contact the earth at a lower surface 304 of borehole 300. Once in contact with the lower surface 304, the earth analysis device 100b may analyze the earth in a single direction as indicated by dashed line 104 to detect subsurface features located below the earth analysis device 100b, such as subsurface feature 106.

Boreholes are commonly used when exploring for minerals, oil and gas, and other natural resources. Encountering an unforeseen change in the composition of the earth while drilling a borehole may create hazards, increase costs, damage tools, or impose missed opportunities. Accordingly, having information about subsurface features prior to and/or during drilling a borehole may reduce the expense associated with drilling boreholes.

Advantageously, earth analysis device 100b may provide information about subsurface features in the direction indicated by dashed line 104 during the process of drilling borehole 300. The information provided by earth analysis device 100b may prevent unnecessary effort spent drilling in an undesirable location, prevent encounters with conditions or objects that may be hazardous to personnel or equipment, and/or may provide information regarding a distance to a subsurface feature that may be helpful in optimizing the efforts of personnel and the use of equipment.

In some embodiments, earth analysis device 100b may be lowered into a borehole 300 until earth analysis device 100b contacts lower surface 304 of the borehole 300. Earth analysis device 100b may then analyze the earth in the direction indicated by dashed line 104.

In another embodiment, earth analysis device 100b may be incorporated into a portion of a drill that contacts lower surface 304, such as a drill face. This embodiment advantageously enables a drill operator to analyze a portion of the earth located ahead of the drill face in the direction indicated by dashed line 104 (e.g., the direction of drilling) without removing the drill from borehole 300. In some cases, the drill operator may stop drilling, analyze the earth ahead of the drill face using earth analysis device 100b, and based on the information provided by earth analysis device 100b, decide whether to continue drilling. In other cases, the drill operator may operate the earth analysis device 100b while simultaneously drilling.

Since earth analysis device 100b may be positioned in borehole 300 a significant distance away from earth surface 102, some portions of earth analysis device 100b may be located in borehole 300 and other portions of earth analysis device 100b may be located above earth surface 102. For example, a user interface portion of earth analysis device 100b may be located above earth surface 102 to be accessible to an operator. In this case, a communication bus 302 may enable communication between portions of earth analysis device 100b located above earth surface 102 and portions of earth analysis device 100b located in borehole 300. For example, communications bus 302 may be an electrical or optical cable.

Of course, boreholes may be oriented in directions other than vertically, for example, boreholes may be oriented horizontally. Earth analysis device 100b may be used in boreholes oriented other than vertically in some embodiments.

Other embodiments of earth analysis device 100 are also contemplated. For example, a robotically deployed embodiment of earth analysis device 100 may advantageously be used in areas where human access is impossible or impractical.

Figure 4:
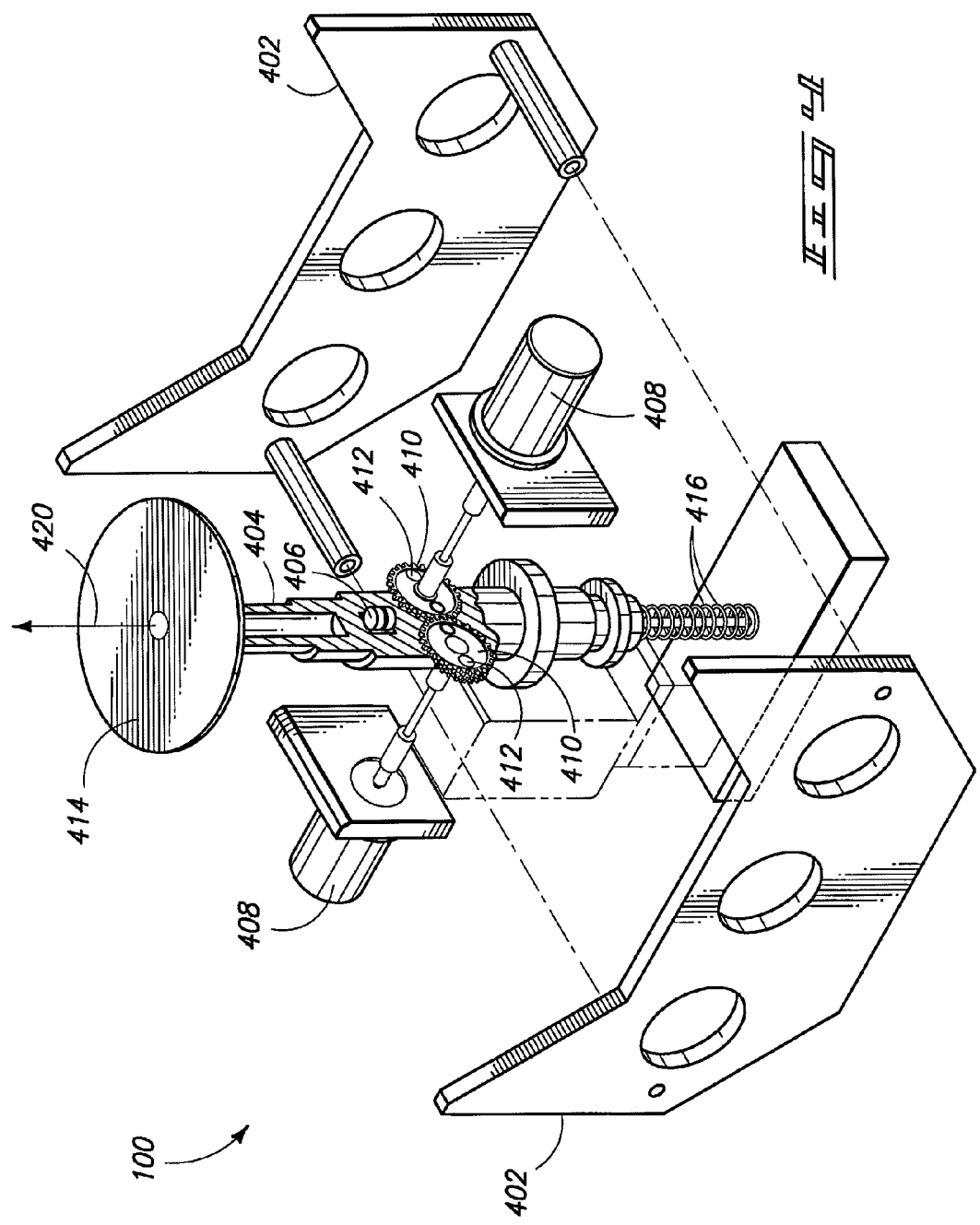
FIG. 4 is an exploded isometric view of an embodiment of an earth analysis device.

Referring to FIG. 4, one possible embodiment of earth analysis device 100 is illustrated. Earth analysis device 100 includes a device body 402 and a movable member 404. Movable member 404 is configured to move relative to device body 402 along a single axis 420. A face portion 414 of movable member 404 is configured to engage the earth and is positioned perpendicular to axis 420. Accordingly, when face portion 414 is engaged with earth surface 102 (FIG. 1) (by turning earth analysis device 100 upside down with respect to its position depicted in FIG. 4 and placing face portion 414 in contact with earth surface 102), axis 420 is substantially perpendicular to earth surface 102. Of course, in some embodiments, earth analysis device 100 may be engaged with a vertically oriented earth surface, such as an earthen wall of a cave, so that axis 420 is substantially perpendicular to the earth surface, but is horizontally oriented.

Movable member 404 may move along axis 420 in response to at least two different vibrational sources. First, when face portion 414 is engaged with earth surface 102, movable member 404 may move with respect to device body 402 in response to vibrational energy imparted to face portion 414 by earth surface 102. For example, reflected acoustic wave 110 (FIGS. 1-3) may vibrate earth surface 102 and may thereby move movable member 404 when face portion 414 is engaged with earth surface 102.

Movable member 404 may also move with respect to device body 402 in response to vibrational energy imparted to movable member 404 by a vibratory source. Furthermore, the movement of movable member 404 due to the vibratory source may be imparted into earth surface 102 when face portion 414 is engaged with earth surface 102, thereby vibrating earth surface 102. Movable member 404 may be configured to move relative to device body 402 only along axis 420 and, therefore, may impart vibrational energy into earth surface 102 only in a single substantially lineal direction along axis 420, which may be substantially perpendicular to earth surface 102 when face portion 414 is engaged with earth surface 102.

The vibratory source may be configured to sequentially vibrate the movable member 404 at a plurality of frequencies. In one embodiment, the amplitude of the vibrations may vary with the plurality of frequencies. For example, amplitudes of lower frequency vibrations may be lower than higher frequency vibrations. In one embodiment, the vibratory source includes counter-rotating gears 410, motors 408, and eccentric masses 412. Each counter-rotating gear 410 includes one of eccentric masses 412. Motors 408 rotate counter-rotating gears 410 in opposite directions.

Eccentric masses 412 are placed within counter-rotating gears 410 to be balanced with respect to their distance and direction from the axial center of movable member 404 along an axis perpendicular to axis 420. In other words, the horizontal distance between the axial center of movable member 404 and one of eccentric masses 412 is the same as the horizontal distance between the axial center of movable member 404 and the other of eccentric masses 412, but the one eccentric mass 412 is on one side of the axial center of movable member 404 and the other eccentric mass 412 is on the other side of the axial center of movable member 404. This placement minimizes forces due to eccentric masses 412 that tend to vibrate movable member 404 along an axis perpendicular to axis 420.

In contrast, eccentric masses 412 are placed within counter-rotating gears 410 to be unbalanced with respect to their location along axis 420. In other words, both eccentric masses 412 are on the same side of a horizontal line bisecting counter-rotating gears 410 at the same time. Consequently, eccentric masses 412 tend to force movable member 404 in a direction toward face portion 414 during half of the rotation of counter-rotating gears 410 and tend to force movable member 404 in a direction away from face portion 414 during the other half of the rotation of counter-rotating gears 410. Other embodiments of eccentric masses are also possible. For example, the vibratory source may use movable eccentric masses and positions of the movable eccentric masses may be moved to provide varied eccentricities as a function of frequency in one embodiment. The movable eccentric masses may be configured so that the amplitude of vibrations generated by the vibratory source is approximately constant as the frequency of the vibrations increases in one arrangement. Consequently, in the one arrangement, vibrations reflected by subsurface feature 106 that are imparted to movable member 404 may be more easily distinguished because the reflected vibrations may cause the motion of movable member 404 to vary from the approximately constant amplitude motion imparted to movable member 404 by the vibratory source. In some embodiments, different eccentric masses may be used in the movable member. For example, the eccentric masses may be removable so that alternative eccentric masses having different weights may be interchangeably placed within the counter-rotating gears 410.

Counter-rotating gears 410 are engaged with each other via teeth to ensure that eccentric masses 412 remain in place relative to one another. For example, when the eccentric mass 412 of the left counter-rotating gear 410 is in a nine-o'clock position, the eccentric mass 412 of the right counter-rotating gear 410 is in a three-o'clock position. Similarly, when the eccentric mass 412 of the left counter-rotating gear 410 is in a six-o'clock position, the eccentric mass 412 of the right counter-rotating gear 410 is also in a six-o'clock position.

Accordingly, the rotation of counter-rotating gears 410 by motors 408 vibrates movable member 404 in a single lineal direction along axis 420 in one embodiment. The frequency with which eccentric masses 412 vibrate movable member 404 may be altered by changing the speed of motors 408 and the magnitude of the vibrations may be altered by adjusting the weights of eccentric masses 412.

In the embodiment depicted in FIG. 4, two motors 408 and two counter-rotating gears 410 are illustrated. However, other embodiments are possible in which movable member 404 is vibrated by fewer or additional gears and fewer or additional motors, or using any other suitable arrangement.

Earth analysis device 100 also includes a sensor 406 coupled to movable member 404. Sensor 406 is configured to provide information about the motion of movable member 404, for example, resulting from both vibrations imparted to movable member 404 by the vibratory source and vibrations imparted to movable member 404 by earth surface 102 when face portion 414 is engaged with earth surface 102. Sensor 406 may provide the motion information via a signal. The signal may be an electrical signal, optical signal, wireless signal, or other signal capable of conveying information to processing circuitry described below in relation to FIG. 5. Sensor 406 may be a geophone, accelerometer, encoder, or other device configured to produce a signal indicative of the motion of movable member 404.

Sensor 406 may provide a signal indicative only of movement of movable member 404 along axis 420 if movable member 404 is configured to move only along axis 420, with respect to device body 402 in one embodiment.

Other sensor embodiments may include a sensor attached to device body 402 as long as the sensor is able to sense movement of movable member 404. For example, the sensor could be an optical sensor mounted on device body 402 or other reference point that senses movement of a reflective portion of movable member 404. In this manner, the sensor is connected to device body 402, but may also be coupled to or otherwise configured to monitor movement of movable member 404.

Earth analysis device 100 may also include a reaction force restraint 416. In some embodiments, reaction force restraint 416 may be a spring. Reaction force restraint 416 may be configured to keep face portion 414 engaged with earth surface 102 while movable member 404 is vibrated by the vibratory source. Reaction force restraint 416 may alternatively or additionally be configured to resist movement of face portion 414 away from earth surface 102 while movable member 404 is vibrated by the vibratory source.

For example, an operator may press face portion 414 of earth analysis device 100 against earth surface 102 with force sufficient to partially compress reaction force restraint 416. The operator may then hold earth analysis device 100 in place while motors 408 are enabled. As movable member 404 vibrates back and forth along axis 420, reaction force restraint 416 may resist face portion 414 disengaging with earth surface 102.

Figure 5:
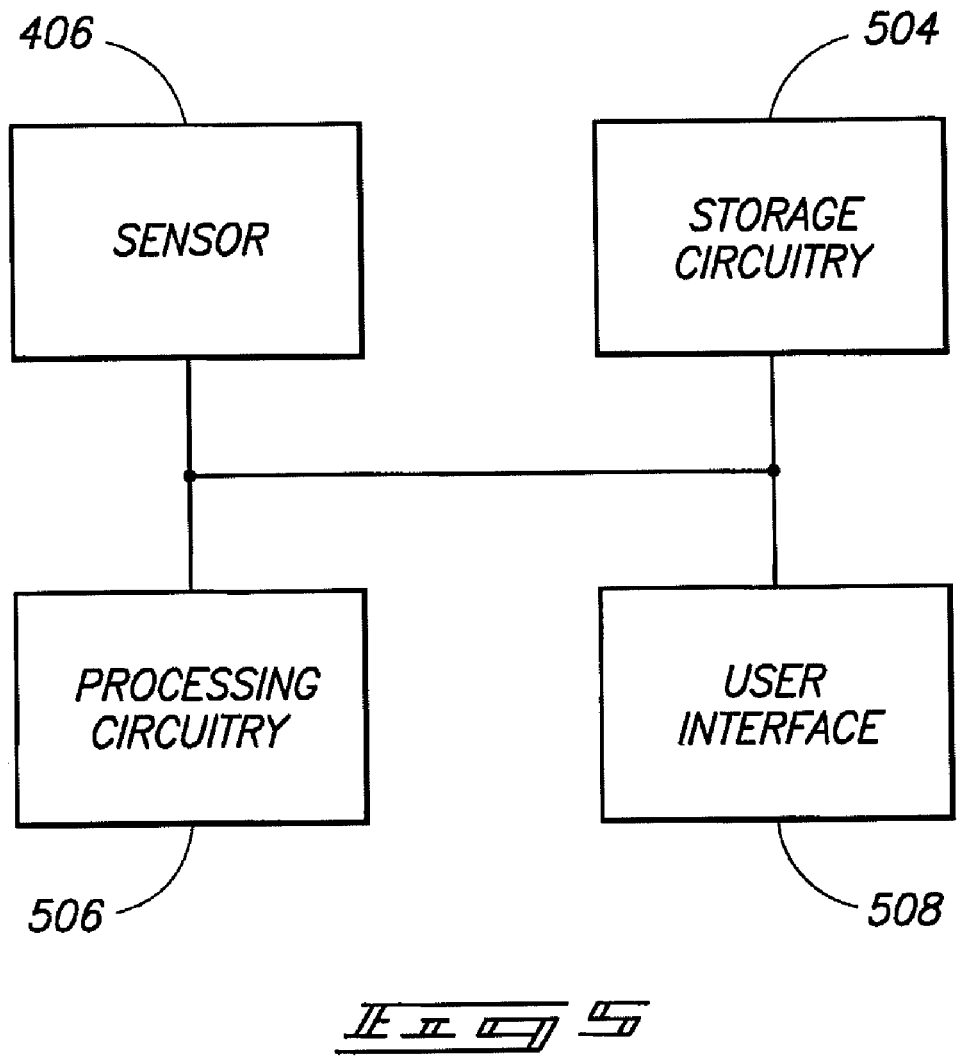
FIG. 5 is a functional block diagram of circuit components of an earth analysis device according to one embodiment.

Referring to FIG. 5, circuit components of earth analysis device 100 (FIG. 1) are shown in one embodiment. Other embodiments are possible including less, more, and/or alternative components. As was described above in relation to FIG. 4, sensor 406 provides information regarding motion of movable member 404. In one configuration, sensor 406 provides the motion information to processing circuitry 506. Sensor 406 may provide the motion information via an electrical, optical, wireless, or other signal.

Processing circuitry 506 is configured to monitor and control analysis operations of earth analysis device 100 in one embodiment. Processing circuitry 506 may analyze the information provided by sensor 406 to ascertain information regarding subsurface features such as location, distance, etc. Processing circuitry 506 may comprise circuitry configured to implement desired programming provided by appropriate media in at least one embodiment. For example, the processing circuitry 506 may be implemented as one or more of a processor and/or other structure configured to execute executable instructions including, for example, software and/or firmware instructions, and/or hardware circuitry. Exemplary embodiments of processing circuitry 506 include hardware logic, PGA, FPGA, ASIC, state machines, and/or other structures alone or in combination with a processor. These examples of processing circuitry 506 are for illustration and other configurations are possible.

In another configuration, sensor 406 may provide the motion information to storage circuitry 504. Storage circuitry 504 may store the information in memory. Processing circuitry 506 may the access the motion information stored by storage circuitry 504. In this manner, sensor 406 provides the motion information to the processing circuitry 506 indirectly through the storage circuitry 504.

Storage circuitry 504 may be embodied in a number of different ways using electronic, magnetic, optical, electromagnetic, or other techniques for storing information. Some specific examples of storage circuitry include, but are not limited to, a portable magnetic computer diskette, such as a floppy diskette, zip disk, hard drive, Random Access Memory, Read Only Memory, Flash memory, cache memory, and/or other configurations capable of storing programming, data, or other digital information.

Processor-usable media may include any article of manufacture(s) that can contain, store, or maintain programming, data, and/or digital information for use by or in connection with an instruction execution system including processing circuitry in the exemplary embodiment. For example, exemplary processor-usable media may include any one of physical media such as electronic, magnetic, optical, electromagnetic, infrared, or semiconductor media. Some more specific examples of processor-usable media include, but are not limited to, a portable magnetic computer diskette, such as a floppy diskette, zip disk, hard drive, Random Access Memory, Read Only Memory, Flash memory, cache memory, and/or other configurations capable of storing programming, data, or other digital information.

At least some embodiments or aspects described herein may be implemented using programming stored within appropriate processor-usable media and/or communicated via a network or other transmission media and configured to control appropriate processing circuitry. For example, programming may be provided via appropriate media including, for example, embodied within articles of manufacture, embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure or medium. Exemplary programming including processor-usable code may be communicated as a data signal embodied in a carrier wave in but one example.

Processing circuitry 506 processes the motion information provided by sensor 406 and provides information regarding a subsurface feature using the motion information. For example, processing circuitry 506 may provide information regarding a location of a subsurface feature or may provide a distance from earth analysis device 100 to a subsurface feature.

Processing circuitry 506 may provide the information regarding the subsurface feature to a user interface 508. User interface 508 may then provide the information in a human-readable format to a user. For example, user interface 508 may provide the information visually or audibly. A user may also control earth analysis device 100 using user interface 508.

Sensor 406, storage circuitry 504, processing circuitry 506, and user interface 508 may be arranged in a number of different configurations. By way of example, storage circuitry 504, processing circuitry 506, and user interface 508 may all be physically mounted on device body 402 of earth analysis device 100. Alternatively, storage circuitry 504 may be physically mounted on device body 402, but processing circuitry 506 and user interface 508 may be removably coupled to earth analysis device 100. In this arrangement, earth analysis device 100 may be operated for a period of time and motion information may be stored in storage circuitry 504. Subsequently, processing circuitry 506 and user interface 508 may be coupled to earth analysis device 100 to analyze the motion information stored in storage circuitry 504. Other configurations are also possible. For example, networked arrangements or other configurations wherein some components may be remotely located from the location of earth analysis device 100.

Figure 6:
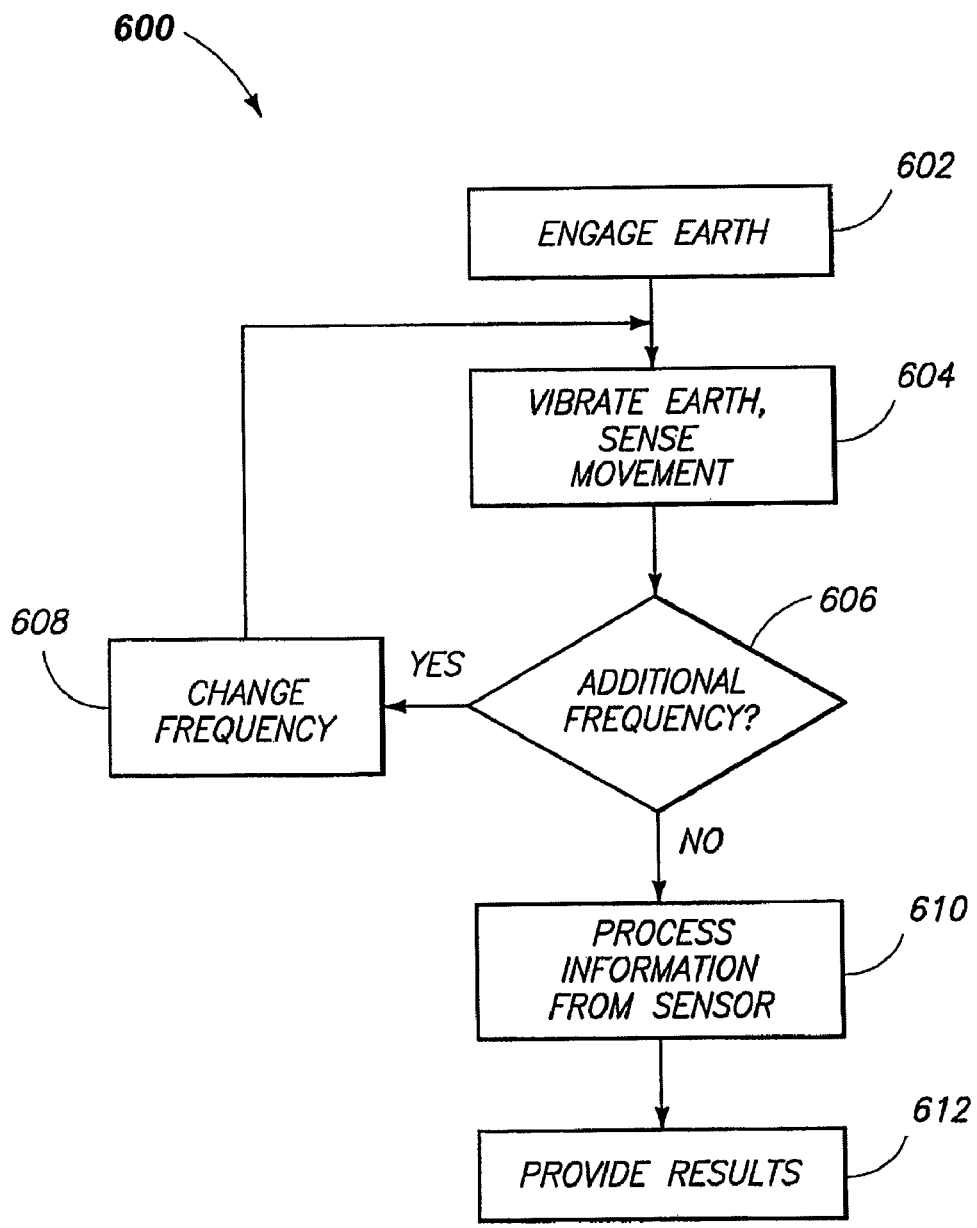
FIG. 6 is a flowchart of a process of earth analysis according to one embodiment.

Referring to FIG. 6, an example of a process for earth analysis is shown according to one embodiment. Other methods are possible and may include more, less and alternative acts.

At an act 602 of method 600, earth analysis device 100 is engaged with the earth surface 102. Earth analysis device 100 may be configured to vibrate earth surface 102 at a set of frequencies by operating the vibratory source at individual frequencies of the set of frequencies at respective moments in time. The number of frequencies in the set and the frequencies themselves may be user-selected. The frequencies may be within a range of 50 Hz to 220 Hz, in one embodiment. As the quantity of frequencies in the set increases, the resolution and accuracy of distance-to-subsurface-feature information provided by earth analysis device 100 may also increase.

At an act 604, earth analysis device 100 vibrates earth surface 102 at a first frequency of the set and senses movement of the earth due to the vibrations and due to vibrations reflected by one or more subsurface features 106.

At an act 606, a determination is made whether earth analysis device 100 has been operated at all of the frequencies of the set. If earth analysis device 100 has not been operated at all of the frequencies of the set, the process continues with an act 608. If earth analysis device 100 has been operated at all of the frequencies of the set, the process continues with an act 610.

At act 608, earth analysis device 100 is configured to operate at a next frequency of the set and the process continues with act 604.

In an alternative embodiment of the process, earth analysis device 100 may sweep its frequency across a range of frequencies rather than discretely stepping through a set of frequencies.

Once earth analysis device 100 has been operated at all of the frequencies of the set, at act 610, movable-member motion information from sensor 406 is processed by processing circuitry 506. As was described above in relation to FIG. 5, the movable-member motion information from sensor 406 may be stored in storage circuitry 504 prior to processing circuitry 506 processing the motion information.

In an alternative embodiment of the process, processing circuitry 506 may process information from sensor 406 prior to changing the vibration frequency of earth analysis device 100. In this embodiment, act 610 may take place after act 604 and prior to act 606.

At an act 612, based on the processing performed by processing circuitry 506, information regarding subsurface feature 106 is provided. As was described above, the information regarding subsurface feature 106 may be presented by user interface 508.

In some embodiments of method 600, earth analysis device 100 may analyze a portion of the earth known to be substantially free from reflective subsurface features prior to act 602 also referred to as a "calibration" location. In such embodiments, motion of movable member 404 may be attributed to the vibratory source but not to reflected vibrations since reflecting subsurface features are not present. Advantageously, this analysis may be used to calibrate earth analysis device 100 by determining, for example, the speed of sound in the earth being analyzed using techniques described in U.S. Pat. No. 7,357,030, to Novascone et al., filed on Nov. 11, 2004, and titled "Apparatus and Methods for Determining at Least One Characteristic of a Proximate Environment." Initial calibration of earth analysis device 100 may improve the accuracy of information regarding subsurface feature 106 provided by processing circuitry 506 subsequently analyzed using a calibrated device 100 also residing within a portion of the earth comprising material similar to the calibration location.

Figure 7:
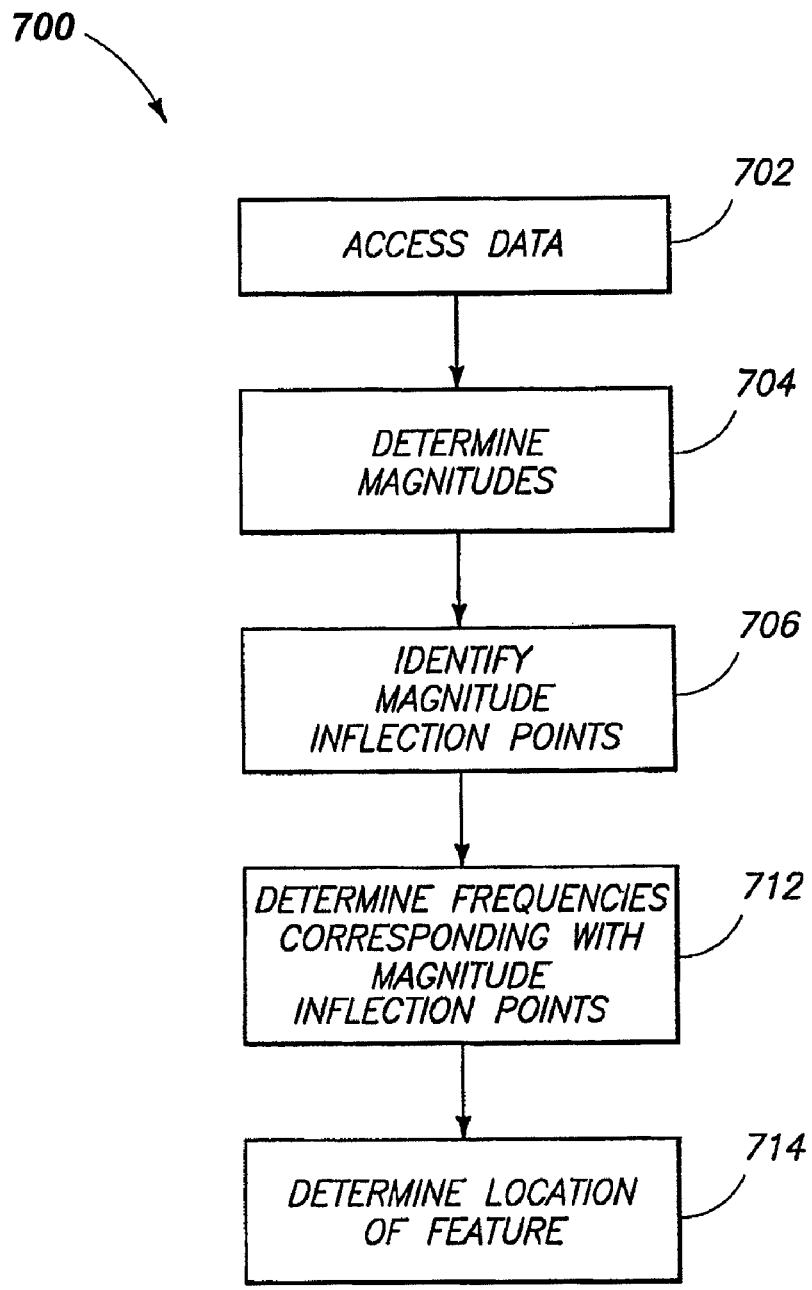
FIG. 7 is a flowchart of a process of subsurface feature detection according to one embodiment.

Referring to FIG. 7, an example of a process 700 for detecting a subsurface feature is illustrated according to one embodiment. This process may be utilized to perform act 610 described above in relation to FIG. 6. Other methods are possible including more, less, or alternative acts.

At an act 702 of process 700, processing circuitry 506 accesses movable-member motion information provided by sensor 406. As was described above, processing circuitry 506 may receive motion data directly from sensor 406. Alternatively, sensor 406 may store motion information in storage circuitry 504 and processing circuitry 506 may subsequently access the stored information by requesting the stored information from storage circuitry 504.

At an act 704, processing circuitry 506 determines a magnitude of the movable-member motion information for each of the frequencies of the set of frequencies. In other words, for each frequency, processing circuitry 506 determines the maximum displacement of movable member 404.

For each frequency, the motion of movable member 404 may be influenced by at least two different sources of movement. First, the motion of movable member 404 may be affected by vibrations imparted to movable member 404 by the vibratory source of earth analysis device 100 (e.g., eccentric masses 412, counter-rotating gears 410, and motors 408).

Second, the motion of movable member 404 may be affected by vibrations previously imparted to movable member 404 by the vibratory source that have been reflected by subsurface feature 106 and have propagated upward to earth surface 102.

Since these two sources of movement may add destructively, the maximum displacement of movable member 404 when subsurface feature 106 is present may be smaller than the maximum displacement when no reflected vibrations are present. The two sources of movement may alternatively add constructively so that the maximum displacement of movable member 404 when subsurface feature 106 is present may be greater than the maximum displacement when no reflected vibrations are present.

The frequency of the vibratory source and the distance from earth analysis device 100 to subsurface feature 106 may determine the degree to which the two sources of movement combine destructively or constructively.

At an act 706, processing circuitry 506 identifies points of zero slope by identifying frequencies at which either the magnitude stops increasing and starts decreasing or the magnitude stops decreasing and starts increasing. Points of zero slope are illustrated in FIG. 8.

Figure 8B:
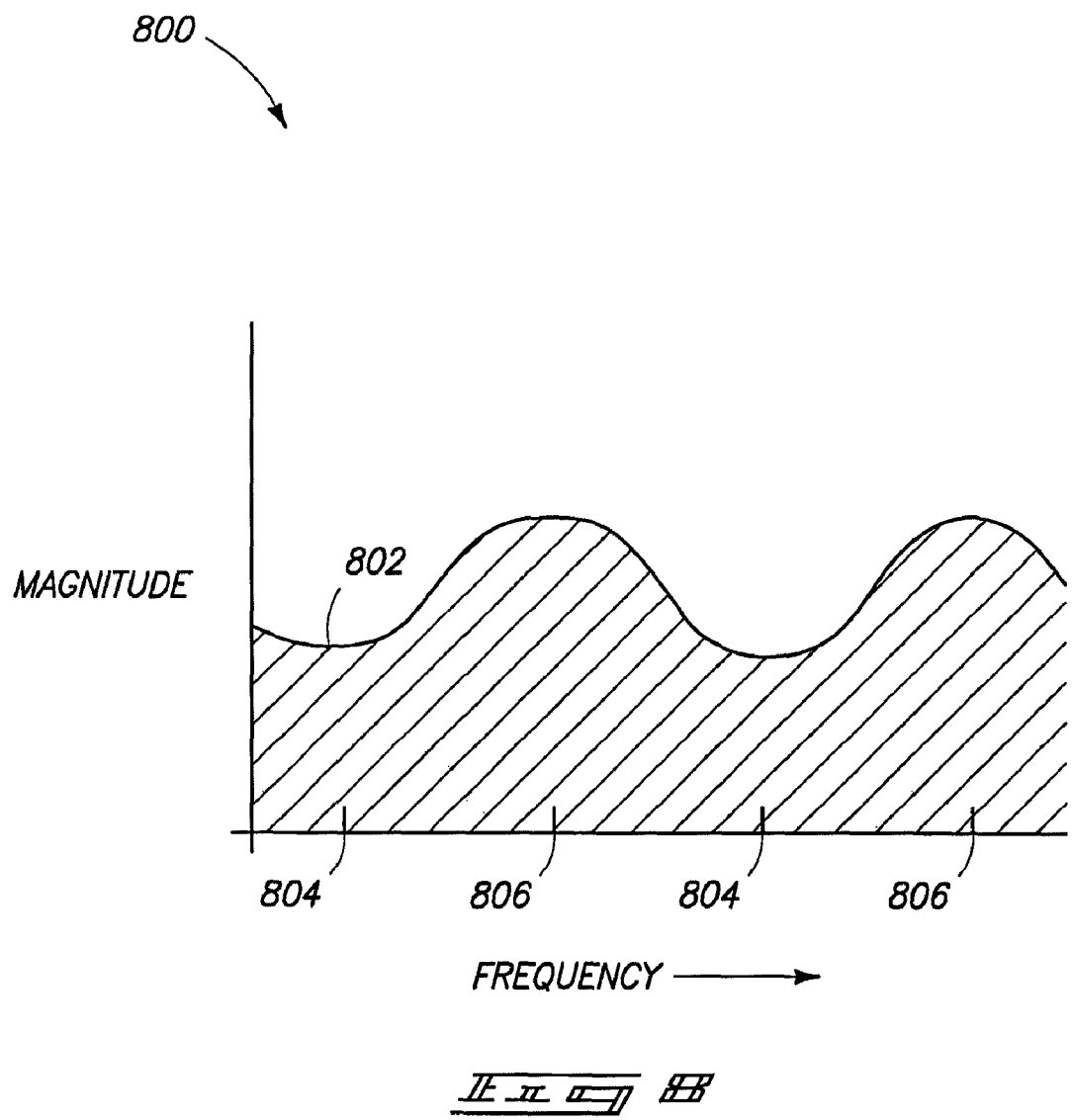
FIG. 8 is a chart illustrating magnitudes of a signal provided by a sensor as a function of frequency according to one embodiment.

Referring to FIG. 8, a chart 800 illustrates an example plot 802 of magnitude versus frequency. As was described above, for each frequency, processing circuitry 506 determines a magnitude. Accordingly, plot 802 of magnitude versus frequency may be constructed from the magnitudes determined by processing circuitry 506. Interpolation may be applied to plot 802 to create a continuous line. Furthermore, filtering may be applied to plot 802 to produce a smoother plot.

In some cases, the amplitude of the vibrations imparted to movable member 404 may increase with frequency, as mentioned above. Processing circuitry 506 may perform additional processing to identify points of zero slope. In one embodiment, processing circuitry 506 may process the motion information by dividing out powers of the vibration frequency (e.g., frequency squared, frequency cubed) to make the points of zero slope more apparent.

Returning now to FIG. 7, at an act 712, processing circuitry 506 may determine frequencies corresponding with the points of zero slope by identifying frequencies at which either the magnitude stops increasing and starts decreasing or the magnitude stops decreasing and starts increasing. For example, returning now to FIG. 8, a first set of frequencies 804 are frequencies at which the magnitude of plot 802 stops decreasing and starts increasing. Accordingly, frequencies 804 are points of zero slope. Frequencies 804 may be referred to as minimum points of zero slope or minimums.

A second set of frequencies 806 are frequencies at which the magnitude of plot 802 stops increasing and starts decreasing. Accordingly, frequencies 806 are also points of zero slope. Frequencies 806 may be referred to as maximum points of zero slope or maximums. Although four distinct points of zero slope are depicted in FIG. 8 to illustrate the concept of points of zero slope, earth analysis device 100 may provide information regarding a subsurface feature based on fewer than four points of zero slope or more than four points of zero slope.

Returning now to FIG. 7, at an act 714, processing circuitry 506 determines a location of subsurface feature 106 based on the points of zero slope. If subsurface feature 106 has a lower impedance than the earth located between subsurface feature 106 and earth analysis device 100, a maximum may occur at a vibration frequency for which subsurface feature 106 is one-fourth of a wavelength away from earth analysis device 100. Accordingly, one embodiment of processing circuitry 506 may determine the lowest frequency at which a maximum occurs and determine the distance to subsurface feature 106 based on the wavelength of the lowest frequency.

Other relationships may also be used. For example, if subsurface feature 106 has a lower impedance than the earth located between subsurface feature 106 and earth analysis device 100, a minimum may occur at a vibration frequency for which subsurface feature 106 is one-half of a wavelength away from earth analysis device 100. Accordingly, one embodiment of processing circuitry 506 may determine the lowest frequency at which a minimum occurs and determine the distance to subsurface feature 106 based on the wavelength of the lowest frequency. Some embodiments of processing circuitry 506 may determine the distance to subsurface feature 106 using both the lowest minimum and the lowest maximum. Still other relationships may be used for a subsurface feature having a higher impedance than the earth located between the subsurface feature 106 and earth analysis device 100.

Furthermore, processing circuitry 506 may utilize additional minimums and maximums (e.g., minimums and maximums having corresponding frequencies that are higher than frequencies of the lowest frequency minimum and lowest frequency maximum) in determining the distance to subsurface feature 106. In some cases, the additional minimums and maximums may be increasingly closer together as the frequency increases. Additional minimums and maximums may be used if subsurface feature 106 is located several wavelengths away from earth analysis device 100.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. The inventors hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, the inventors consider the disclosure to include, disclose and describe methods which include less, more and/or alternative steps than those methods explicitly disclosed as well as apparatus which includes less, more and/or alternative structure than the explicitly disclosed structure.

What is claimed is:

1. A subsurface feature detection method comprising:
receiving a sensor signal indicative of a signature of a signal imparted to the earth by a movable member responsive to a vibratory source and concurrently responsive to reflected acoustic waves in a single substantially lineal direction; wherein the vibratory source operates at a plurality of frequencies at different moments in time;
for two or more frequencies among the plurality of frequencies, determining magnitudes of the sensor signal;
identifying at least one point of zero slope for the sensor signal using the magnitudes; and
providing information regarding a subsurface feature of the earth using the at least one point of zero slope.

2. The method of claim 1, wherein identifying the at least one point of zero slope comprises identifying a point that is indicative of at least one of a maximum magnitude and a minimum magnitude of the sensor signal.

3. The method of claim 1, further comprising determining a distance from a location where the acoustic waves are transmitted to the earth and the subsurface feature using a frequency among the plurality of frequencies that corresponds to the at least one point of zero slope.

4. The method of claim 3, wherein providing information comprises providing information regarding the distance from the location to the subsurface feature.

5. The method of claim 1, wherein receiving the sensor signal comprises receiving information representing motion of the movable member due to the acoustic waves transmitted to the earth in only a single substantially lineal direction.

6. The method of claim 1, wherein the acoustic waves are transmitted to the earth by rotating at least two counter-rotating gears each with at least one eccentric mass to vibrate the movable member in the single substantially lineal direction.

7. The method of claim 6, wherein rotating at least two counter-rotating gears comprises rotating them at different speeds at the different moments in time to develop the plurality of frequencies.

8. An earth analysis method, comprising:
imparting vibrational energy to a movable member along a substantially lineal direction of movement;
engaging the earth with a substantially flat face portion of the movable member that is substantially perpendicular to the substantially lineal direction while imparting vibrational energy; and
sensing a signal responsive to the movement of the movable member along the substantially lineal direction; wherein the signal is indicative of a signature of the signal imparted to the earth by the movable member responsive to a vibratory source and concurrently responsive to reflected acoustic waves in a single substantially lineal direction.

9. The method of claim 8, further comprising positioning a device including the movable member in a borehole in the earth and wherein the acts of imparting, engaging, and sensing are performed in the borehole.

10. The method of claim 8, wherein imparting the vibrational energy comprises vibrating the movable member at a plurality of frequencies.

11. The method of claim 10, further comprising:
for two or more frequencies among the plurality of frequencies, determining magnitudes of the signal;
identifying at least one point of zero slope for the signal using the magnitudes; and
providing information regarding a subsurface feature of the earth using the at least one point of zero slope.

12. The method of claim 11, wherein providing information comprises providing information regarding a distance between the flat portion of the movable member and a subsurface feature.

13. The method of claim 11, wherein providing information comprises identifying a location of a subsurface feature in the earth.

14. The method of claim 11, wherein providing information comprises providing information regarding a subsurface feature comprising a subsurface void.

15. The method of claim 8, wherein engaging the earth comprises transmitting an acoustic wave into the earth using the movable member.

16. The method of claim 8, further comprising:
first analyzing the signal responsive to movement of the movable member along the substantially lineal direction at a first location;
second analyzing the signal responsive to movement of the movable member along a second substantially lineal direction at a calibration location substantially free from reflective subsurface features along the second substantially lineal direction; and
calibrating a device including the movable member using the results of the second analyzing before performing the first analyzing.

17. An article of manufacture including media comprising programming configured to cause processing circuitry to:
access data representing motion of a sensor comprising a signal indicative of a signature of a signal imparted to the earth by a movable member responsive to a vibratory source and concurrently responsive to reflected acoustic waves in a single substantially lineal direction; wherein the vibratory source operating sequentially at a plurality of frequencies;
for individual ones of the frequencies among the plurality of frequencies, determine a magnitude of the data representing a time period in which the vibratory source operates at the individual ones of the frequencies;
identify at least one point of zero slope using the magnitudes at one or more of the individual ones of the frequencies;
identify a feature in the earth using the at least one point of zero slope.

18. The article of manufacture of claim 17, wherein accessing the data comprises accessing the data representing motion of the sensor due to vibrations transmitted into the earth in only a single substantially lineal direction.

19. The article of manufacture of claim 17, wherein the media is further configured to cause the processing circuitry to determine a distance from the location to the feature using frequencies corresponding with the at least one point of zero slope.

20. The article of manufacture of claim 17, wherein the media is further configured to cause the processing circuitry to:
perform a first analysis of first data representing motion of the sensor comprising a first combination of vibrations transmitted into at least a portion of the earth at a first location by the vibratory source and vibrations received from the earth at the first location by the vibratory source;
perform a second analysis of second data representing motion of the sensor comprising a second combination of vibrations transmitted into the earth at a second location by the vibratory source and vibrations received from the earth at the second location by the vibratory source; and
calibrate a device including the sensor using results of the first analysis before performing the second analysis.

* * * * *